Sept. 27, 1960     J. HIBBEN, JR     2,954,247
GOLF CART HANDLE JOINT
Filed Jan. 2, 1957     2 Sheets-Sheet 1
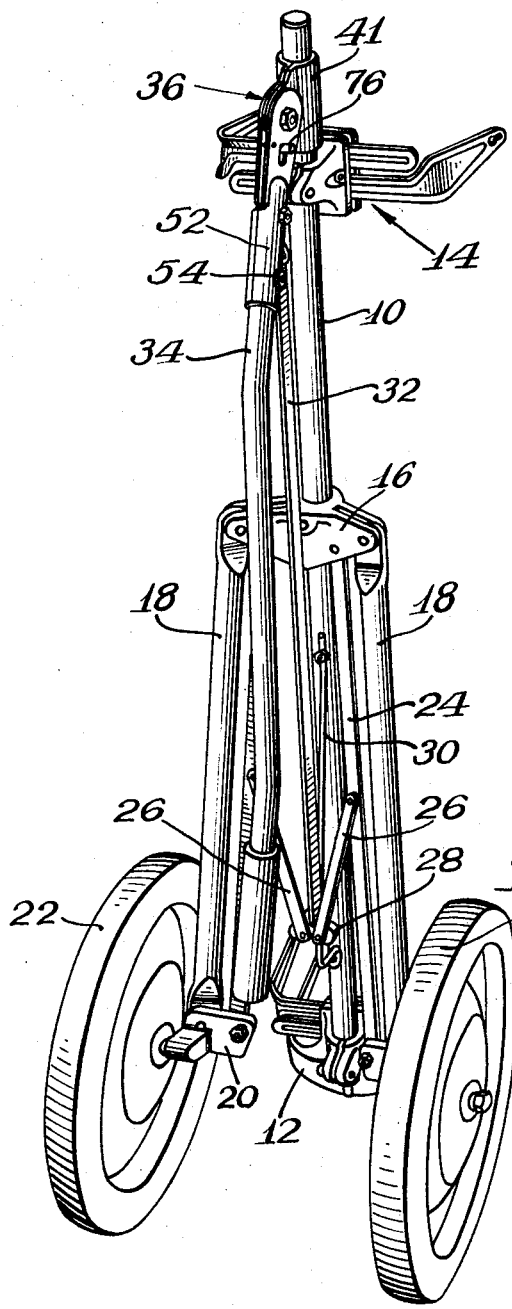
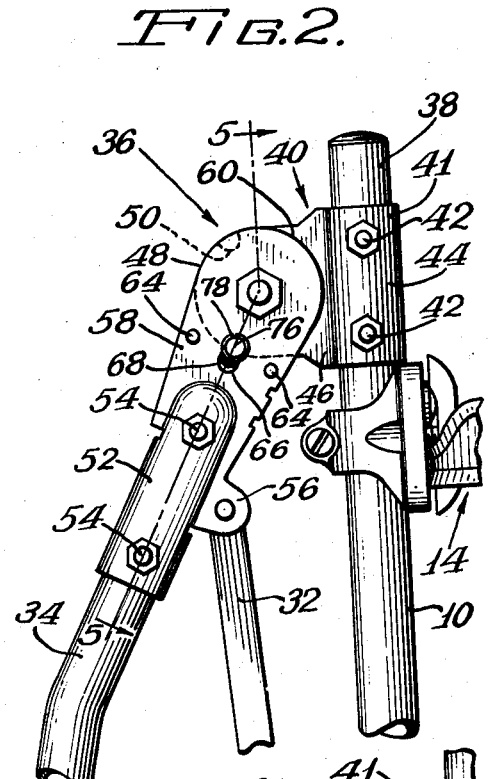
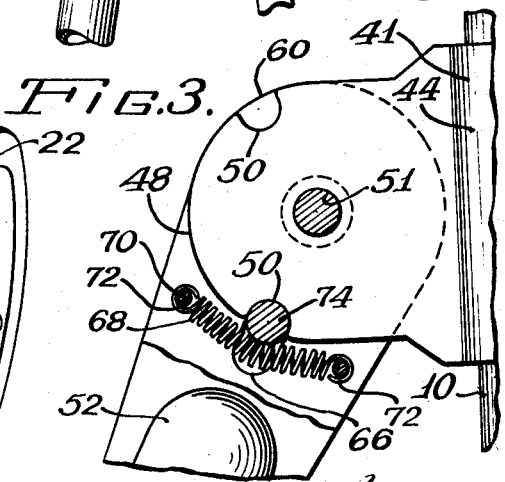
Inventor:
John Hibben, Jr.
By Norton, Davis, Brewer & Burgman
Attys.

Sept. 27, 1960  J. HIBBEN, JR  2,954,247
GOLF CART HANDLE JOINT
Filed Jan. 2, 1957  2 Sheets-Sheet 2
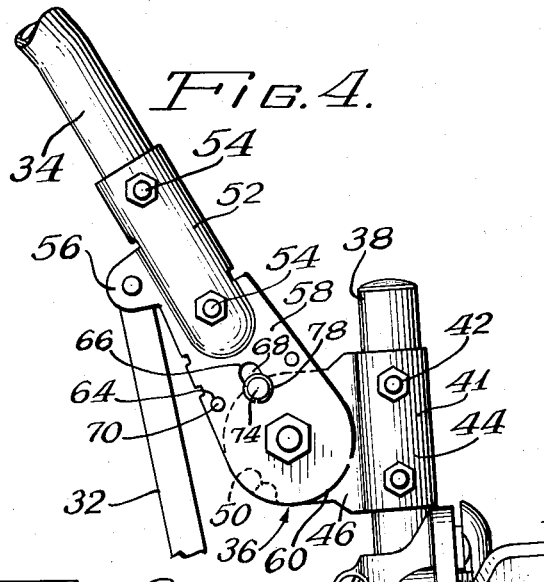
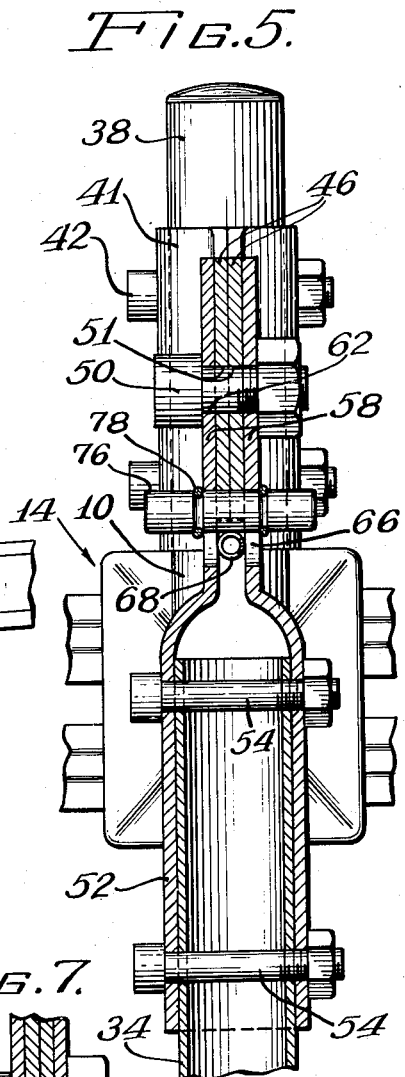
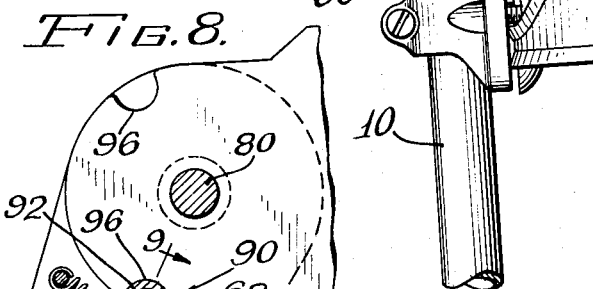
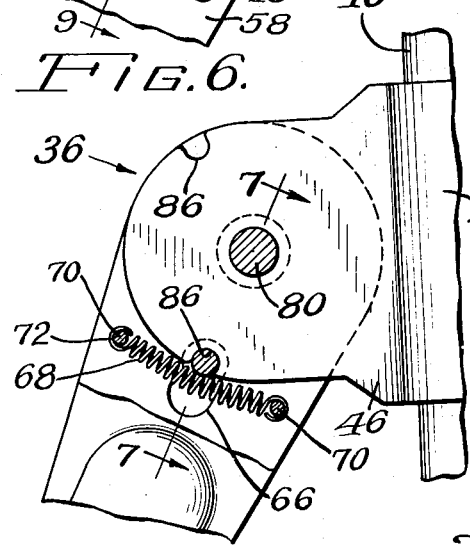
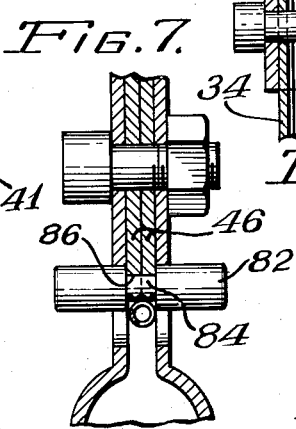
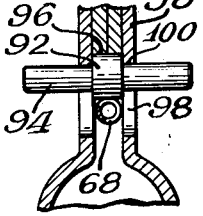
Inventor:
John Hibben, Jr.

United States Patent Office 2,954,247
Patented Sept. 27, 1960

2,954,247

GOLF CART HANDLE JOINT

John Hibben, Jr., 933 Ridge Ave., Evanston, Ill.

Filed Jan. 2, 1957, Ser. No. 632,213

5 Claims. (Cl. 287—14)

My invention relates to a collapsible golf bag cart and particularly to a handle joint for that type golf bag cart which is commonly used to transport golf bags around a golf course.

The cart to which my invention is applied is that characterized by having a shaft constituting a main frame member which has at its lower end a combined foot member and platform on which the golf bag is to rest and which likewise constitutes one of three points of support for the cart. Means are provided upwardly of the platform for lashing the golf bag to the body member. This type of cart likewise has two wheels spaced forwardly of the platform and from each other to form, with the foot member, a tripodal support. The wheels may or may not be collapsible from this extended position of use to a collapsed position with the wheels lying beside the main frame member for transport or storage.

The golf bag cart likewise includes a handle pivotally secured to the frame member which may be folded down against the frame member for storage or extended upwardly and outwardly therefrom in use so as to be generally horizontal when the cart stands upright on the two wheels and the foot member. Extending the wheels of the cart may be accomplished by a linkage integrated with the handle so that as the handle is raised relative to the frame or body member the wheels assume their extended position, or the wheels may be independently movable.

This invention is directed particularly to the proposition that the handle, when the cart is collapsed to storage or transport position extends from the upper end of the frame nearly the full length of the frame and lies close to and substantially parallel with the body, and so could easily constitute a handle for the cart with the bag mounted therein, and the provision of a cart wherein the handle serves as a grip both in the extended use position and also in the collapsed transport position may be considered a major object of my invention.

The handle of a golf bag cart must, of course, be pivotally connected to the body member to be capable of this movement between its collapsed and extended position. The pivotal joint under conditions of golf course use need not be particularly strong since the weight of the cart is carried on the wheels and the handle is employed simply to lift the foot member off the ground a slight distance and thereafter to draw the cart along in trailing relation behind the player. In the modification of the cart, however, to meet the circumstances of my use the joint must not only support wholly the weight of the cart and golf bag secured therein but it must also support such weight under conditions of relatively great unfavorable leverage. The point on the handle which, when seized, will balance the cart and bag in substantially horizontal position is very near the outermost end of the handle. Grips are commonly provided on the ends of such handles and I have found that a handle length sufficient to space the golf bag cart far enough behind the golfer as he pulls the cart behind him so that it does not interfere with his walking places the grip on the end thereof at an appropriate point to support the golf bag and cart in the balanced horizontal position most comfortable for transporting.

Another object of my invention may, therefore, be considered to be the provision of a pivoting joint connecting a golf cart handle to the body thereof which is amply strong to support the full weight of the cart and attached golf bag in spite of the unfavorable leverage thereon.

Still another object of my invention is the provision of such a joint which is inexpensive, simple, ingenious, and attractive in appearance.

Other objects and advantages of my invention will be apparent from the following description and drawings, of which:

Fig. 1 is a perspective view of a collapsed golf bag cart incorporating my invention;

Fig. 2 is an enlarged elevation of the left side of the upper end of the cart illustrated in Fig. 1;

Fig. 3 is a still further enlarged substantially central section through the joint of Fig. 2;

Fig. 4 is a view similar to Fig. 2 showing, however, the handle in its extended position;

Fig. 5 is a section taken substantially along the line 5—5 of Fig. 2, looking in the direction of the arrows;

Fig. 6 is a section similar to Fig. 3 showing, however, an alternate form of my invention;

Fig. 7 is a section taken substantially along the line 7—7 of Fig. 6 looking in the direction of the arrows;

Fig. 8 is a view similar to Fig. 6 illustrating another form of my invention; and Fig. 9 is a view similar to the lower part of Fig. 7 illustrating further the modification of Fig. 8.

The golf bag cart of Fig. 1 consists generally of a main body or frame member 10 which generally is a tubular shaft. To the lower end thereof is secured the combination foot member and golf bag platform 12. Adjacent the upper end, a golf bag holder 14 is provided in which the upper end of the golf bag is to rest and within which the golf bag is secured, usually by straps or lashing.

In the illustrated cart, a wheel-supporting member 16 is slidably mounted on the frame member 10 and has the upper end of side frame members 18 pivotally secured thereto to be movable away from the frame member at an angle of 120°. The lower ends of the side frame members support axle blocks 20 which in turn support the axles of wheels 22. Caster links 24 extend parallel to the side frame members between the wheel-supporting member 16 and the axle blocks 20 so that the parallel orientation of the wheels is maintained whether the cart wheels are in collapsed or extended position. The side frame members are moved between their extended position and collapsed position by a pair of toggle links 26 connected at one end to the caster links 24 and at their lower ends to a block 28 which is vertically slidable on a guide rod 30. A thrust link 32 is connected to the block 28 at one end and at the other end to the handle 34 of the cart at a point spaced from the pivot joint 36 between the handle and the main frame member 10. It will be appreciated that when the handle member 34 is raised relative to the frame member 10, the block 28 will be drawn up, extending the toggle links 26 and forcing the caster links 24 and side frame members 18 outwardly. The cart is collapsed by the reverse process.

In Fig. 2 may be seen in detail a handle joint embodying my invention. In that figure is shown the upper end 38 of the main frame member 10. A pivot mount 40, including a sleeve 41 which encompasses the main frame member 10 adjacent its upper end and ear 46 is secured to the main frame member by bolts or rivets 42. The pivot mount may be formed of either one or two pieces. In the case of two-piece construction, a rectangular piece of metal is given a transverse semi-circular curvature 44 at one end and the other end is shaped to provide an ear 46 having a semi-circular outer periphery 48 with semi-circular notches 50 formed in the semi-circular periphery adjacent to but spaced equally from the ends of the semi-circular periphery. A hole 51 is provided in the ear centrally with respect to the curved periphery 48. Two of these members will then be attached to the upper end of the main frame member 10 to enclose on both sides the frame member and to provide the ear 46 having the outer semi-circular periphery 48 and two notches 50 in that periphery in double thickness.

If one-piece construction is preferred, the transverse curvature 44 which encloses the main body member 10 will extend continuously around the body member 10 on the side away from the ear 46.

The handle 34 is usually formed of tubular stock. To attach the inner end of the handle to the ear 46, two pieces of metal are provided, the reverse complement of each other, each of which includes a half socket 52 which together enclose the end of the handle and are secured to the handle by rivets or bolts 54. A pair of vertical spaced parallel ears 56 extend from the side of the socket and constitute a bracket for the upper end of the thrust link 32. A pair of vertical spaced parallel flanges 58 extend from the outer ends of the socket halves and terminate in a semi-circle as at 60. A hole 62 is formed in the flanges centrally with respect to the semi-circular curvature. A pair of small holes 64 are formed in each flange adjacent the edges thereof and slightly outside the projected circular line in which the flanges terminate. A slot 66 is situated centrally in each of the flanges between the holes 64 and extends transversely of the line between the holes 64. The slots 66 terminate at each end in a semi-circular curvature equal to the curvature of the notches 50 in the ear 46.

To make the joint of my invention, a light tension spring 68 is placed between the flanges 58, and pins 70 extend between the respective pairs of holes 64 and through the eyes 72 of the spring to hold the spring in extended position.

A latch pin 74, which is a simple cylindrical member equal in diameter to the notches 50 and the width of the slots 66, is inserted to span the two slots 66 with the spring 68 bearing against the latch pin 74 to hold it at that end of the slot toward the outer end of the flanges 58. It will be noted that the spring is deformed by the latch pin and, therefore, exerts pressure thereagainst even when the pin is at the end of its travel in slots 66. The latch pin should be long enough to extend well beyond the flanges on either side as at 76 to provide projections sufficient to be gripped to move the pin within slots 66. The latch pin is grooved immediately outside the flanges for the reception of snap rings 78 to hold the latch pin in position between the flanges and prevent its removal from between the flanges.

The flanges are spaced apart a distance to fit snugly over the ear 46. After the latch pin 74 has been inserted between the flanges and secured thereto, the ear 46 is inserted between the flanges, the central holes 62 of the flanges and 51 of the ear brought into registry and the members secured together by a rivet or bolt 80.

Figs. 6 and 7 illustrate a modification of my invention. The structure is substantially similar to the first described embodiment in general principle of operation and general arrangement of parts. This modification, however, involves the use of a centrally grooved latch pin and avoids the use of the snap rings employed to retain the latch pin of the first described modification in place.

In this modification, the latch pin 82 is formed from cylindrical stock but has a central groove 84 extending thereabout rectangular in profile and equal in width to the ear 46. The slot 66 is of the same diameter as in the previously described embodiment and of a width equal to the greatest diameter of the pin 82. The notches 86 in the ear 46 are, however, of reduced diameter and equal to the diameter of the grooved central portion 84 of the pin 82. Likewise, they are correspondingly shallower so that when the pin is engaged with one of the notches, the grooved portion fits against the bottom of the notch and at the same time the ungrooved portion of the pin fits against the inner end of the slot 66.

Figs. 8 and 9 illustrate another modification of my invention which generally may be considered as the reverse of the form shown in Figs. 6 and 7. Like Fig. 6, Fig. 8 is a transverse section to the joint taken just back of the near bracket ear of the handle. In this modification, the latch pin 90 has a large central diameter 92 and reduced end portions 94. The enlarged central portion 92 fits between the two bracket flanges 58 and drops into enlarged notches 96 proportioned to receive the portion 92; i.e., the diameter of the notches is equal to or slightly greater than the diameter of portion 92. The end portions 94 of reduced diameter are received in slots 98 of a width only sufficient to permit easy sliding movement of the pin therewithin and substantially smaller than the diameter of the pin portion 92. The narrower slots thus serve to confine the latch 90 between the flanges 58.

The outer end 100 of the slots 98 is semi-circular and concentric with the notches 96 when aligned therewith so that the cross latch is supported in handle locking position both by the notch and by the slot ends to prevent any wobble of the cross latch.

The assembly of this modification will follow generally that employed with the principal form shown in Figs. 1–5. The latch and spring 68 are positioned between the flanges 58, the latch in slots 98, and the flanges secured to the handle. The handle is then secured to the ear 46 as described before.

The installation and assembly of the latch has been explained above. The operation of the latch will be readily apparent from the foregoing. The notches are arranged so that the handle takes either of two positions, a collapsed position where it lies back against the main frame member 10 and substantially parallel thereto and an extended position where the handle extends upwardly and outwardly from the main frame member 10. Movement of the handle between these positions as has been described likewise may compel the movement of the wheels between the collapsed and extended position, as illustrated. To move the handle between the two positions, the latch pin 76 or 82 is moved against the force of the spring 68 to the outer end of the slot 66 by grasping the ends thereof protruding outwardly from the flanges 58. Thereafter, the handle is free to pivot about the bolt 80 until the pin snaps into the other notch. In the modification illustrated in Figs. 1 through 5 the snap rings 78 prevent lateral displacement of the pin 76 out of the groove 66. In the modification illustrated in Figs. 6 and 7, the shoulders of the groove 84 of the pin 82 ride against the unnotched semi-circularly curved portion of the ear 46 and embrace opposite edges of the ear so as likewise to prevent lateral displacement.

The purpose underlying the modification illustrated in Figs. 6 and 7 is to permit more ready removal or replacement of the pin 82 after the handle has been completely assembled or attached to the main frame member 10 by the bolt 80. It will be appreciated that in order to remove the pin 74 from the slot 66, the snap rings would have to be removed. In the case of the modification illustrated in Figs. 6 and 7, however, the spring 68 may be drawn away from the grooved portion of the pin 82, by a screwdriver for instance, the pin backed away in the groove from its position where the groove edges engage the edges of the ear and the pin then simply pulled out of the slot 66.

From the foregoing description, it will be evident that my handle joint amply achieves the advantages claimed for it. It is a joint of great strength which is more than adequate to sustain the full weight of the body of a golf bag cart with the added weight of the golf bag and the clubs contained therein even under the conditions of unfavorable leverage resulting from supporting this total load from the end of the handle. At the same time, it is simple, inexpensive and easily incorporated or applied to existing collapsible golf bag carts.

It is likewise evident that my invention is capable of taking many forms other than those described and I, therefore, desire that my invention be regarded as being limited only as set forth in the following claims.

I claim:

1. A joint for connecting one member to another in various angular relations in a plane, comprising an ear secured to one of said members in said plane, said ear having a substantially circularly curved outer periphery with notches therein, a pair of spaced, parallel projections extending from the other member embracing closely said ear and pivotally secured thereto at the center of said curvature, said projections having a single pair of opposite centrally situated slots therein extending past said curved periphery of said ear, a cross latch of cylindrical stock contained in said slots, proportioned to drop into said notches, extending between said projections and substantially therebeyond on both sides, and a spring secured in tension between said projections and bearing intermediate its ends against said cross latch to urge said cross latch against said curved periphery of said ear and into said notches.

2. A handle joint for a golf bag cart, including a wheeled carriage member and a handle member, comprising a vertical ear adapted to be fixed to one of said members as between said carriage and said handle having a substantially circularly curved outer periphery with notches therein corresponding to the desired handle positions, means including a pair of spaced, parallel projections adapted to be secured to and to extend from the other of said members embracing closely said ear and pivotally secured thereto at the center of said curvature, said projections having opposite centrally situated slots therein extending past said curved periphery of said ear, a cross latch contained in said slots to extend between said projections and substantially therebeyond on both sides, and a spring secured in tension between said projections and bearing intermediate its ends against said cross latch to urge said cross latch against said curved periphery of said ear and into said notches.

3. A joint for connecting one member to another in various angular relations in a plane comprising an ear secured to one of said members in said plane and having a substantially circularly curved outer periphery with notches therein, a pair of spaced parallel projections extending from the other member embracing closely said ear and pivotally secured thereto at the center of said curvature, said projections having a single pair of centrally situated opposite slots therein extending past said curved periphery of said ear, a cylindrical cross latch contained in said slots to extend between said projections and substantially therebeyond on both sides, means on said cross latch engaging the longitudinal edges of said slots to keep the central portion of said cross latch between said projections in said slots, and means resiliently bearing against said latch between said projections urging said latch against said curved periphery, said last means comprising a spring secured in tension between said projections and bearing intermediate its ends against the center of said cross latch and that side thereof opposite said periphery.

4. A joint for connecting one member to another in various angular relations in a plane, comprising an ear secured to one of said members in said plane, said ear having a generally circularly curved outer periphery with semi-circular notches therein of a given diameter, a pair of spaced parallel projections extending from the other member embracing closely said ear and pivotally secured thereto at the center of said curvature, said projections having a pair of centrally situated opposite slots therein different in width from the diameter of said notches extending across said curved periphery of said ear, a cylindrical cross latch contained in said slots to extend between said projections and substantially therebeyond on both sides, said cross latch having a diameter between said projections equal to the diameter of said notches and a diameter elsewhere equal to the width of said slots, and means urging said latch against said curved periphery, said means comprising a spring secured in tension between said projections and bearing intermediate its ends against the center of said cross latch and that side thereof opposite said periphery.

5. A handle joint for a golf bag cart including a wheeled carriage member and a handle member comprising a vertical ear adapted to be fixed to one of said members as between said carriage and said handle and having a substantially circularly curved outer periphery with notches therein corresponding to the desired handle positions, means including a pair of spaced parallel projections adapted to be secured to and to extend from the other of said members embracing closely said ear and pivotally secured thereto at the center of said curvature, said projections having opposite, centrally situated slots therein extending past said curved periphery of said ear, a cross latch contained in said slots to extend between said projections and substantially therebeyond on both sides, spring supporting means extending from one of said projections toward the other of said projections on either side of said slots and a spring connected at its ends to said supporting means, said spring bearing intermediate its ends against said cross latch to urge said cross latch against said curved periphery of said ear and into said notches.

References Cited in the file of this patent

UNITED STATES PATENTS

| | | |
|---|---|---|
| 766,605 | Dilg | Aug. 2, 1904 |
| 951,042 | Augenbraum | Mar. 1, 1910 |
| 1,226,324 | Gage | May 15, 1917 |
| 2,594,533 | Baker | Apr. 23, 1952 |
| 2,782,048 | Williams et al. | Feb. 19, 1957 |
| 2,810,586 | Troka | Oct. 22, 1957 |

FOREIGN PATENTS

| | | |
|---|---|---|
| 723,252 | Great Britain | Feb. 2, 1955 |